US012749674B2

(12) United States Patent
Yamashita et al.

(10) Patent No.: US 12,749,674 B2
(45) Date of Patent: Sep. 29, 2026

(54) ELECTRODE AND ELECTRODE MANUFACTURING METHOD

(71) Applicant: Panasonic Intellectual Property Management Co., Ltd., Kadoma (JP)

(72) Inventors: Hiroki Yamashita, Osaka (JP); Reiko Izumi, Osaka (JP); Norihiro Kotani, Osaka (JP); Takayuki Gonjo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 571 days.

(21) Appl. No.: 18/272,717

(22) PCT Filed: Dec. 15, 2021

(86) PCT No.: PCT/JP2021/046307
§ 371 (c)(1),
(2) Date: Jul. 17, 2023

(87) PCT Pub. No.: WO2022/163186
PCT Pub. Date: Aug. 4, 2022

(65) Prior Publication Data

US 2024/0372069 A1 Nov. 7, 2024

(30) Foreign Application Priority Data

Jan. 27, 2021 (JP) ................................ 2021-010950

(51) Int. Cl.
*H01M 4/1391* (2010.01)
*H01M 4/02* (2006.01)
(Continued)

(52) U.S. Cl.
CPC ....... *H01M 4/1391* (2013.01); *H01M 4/0435* (2013.01); *H01M 4/131* (2013.01); *H01M 4/623* (2013.01); *H01M 2004/028* (2013.01)

(58) Field of Classification Search
CPC .. H01M 4/1391; H01M 4/0435; H01M 4/131; H01M 4/623
See application file for complete search history.

(56) References Cited

U.S. PATENT DOCUMENTS

2007/0020514 A1 1/2007 Ozaki et al.
2013/0295463 A1 11/2013 Matsuda et al.
(Continued)

FOREIGN PATENT DOCUMENTS

EP 4224550 A1 8/2023
JP 2007-026984 A 2/2007
JP 2019-512872 A 5/2019

OTHER PUBLICATIONS

International Search Report dated Feb. 8, 2022, issued in counterpart International Application No. PCT/JP2021/046307 (2 pages).
(Continued)

*Primary Examiner* — Sarah A. Slifka
(74) *Attorney, Agent, or Firm* — WHDA, LLP

(57) ABSTRACT

An electrode according to one embodiment of the present disclosure comprises: a core material; and an electrode combined material that is layered onto surfaces of the core material. The electrode combined material comprises an active substance and PTFE. In an image illustrating a composition distribution obtained upon measuring a surface of the electrode combined material using energy dispersion-type X-ray analysis, the standard deviation of the area ratio of PTFE in 30 adjacent sections having a size of 150 μm×133 μm is 6% or less. When the electrode combined material is divided into three equal parts in the thickness direction to create, from the core material side, a first region,
(Continued)

a second region, and a third region, the content (a) of PTFE in the first region, the content (b) of PTFE in the second region, and the content (c) of PTFE in the third region satisfy $(c-a)/(a+b+c) \leq \pm 10\%$.

5 Claims, 2 Drawing Sheets

(51) Int. Cl.

| | |
|---|---|
| ***H01M 4/04*** | (2006.01) |
| ***H01M 4/131*** | (2010.01) |
| ***H01M 4/62*** | (2006.01) |

(56) References Cited

U.S. PATENT DOCUMENTS

2017/0256367 A1 9/2017 Raman et al.
2021/0193398 A1 6/2021 Raman et al.

OTHER PUBLICATIONS

Extended (supplementary) European Search Report dated May 6, 2025, issued in counterpart EP Application No. 21923190.9. (11 pages).

ELECTRODE AND ELECTRODE MANUFACTURING METHOD

CROSS-REFERENCE TO RELATED APPLICATION

This application is a National Phase Application filed under 35 U.S.C. § 371 of International Application No. PCT/JP2021/046307 filed on Dec. 15, 2021 which claims the benefit of priority under 35 U.S.C. § 119 (a) of Japanese Patent Application No. 2021-010950 filed in Japan on Jan. 27, 2021, the contents of which are incorporated herein by reference.

TECHNICAL FIELD

The present disclosure relates to an electrode and a method for manufacturing an electrode.

BACKGROUND ART

An electrode of a non-aqueous electrolyte secondary battery such as a lithium-ion battery is typically produced by a wet method including applying an electrode mixture slurry including an active material, a binder, and the like onto a surface of a core being a metal foil, and then drying and compressing the coating film. In this case, a problem is that migration, that is travelling of the binder during drying of the coating film, easily occurs. The migration of the binder increases the amount of the binder on the surface side compared with the core side of the coating film (electrode mixture layer), leading to uneven distribution of the binder in the thickness direction of the electrode mixture layer.

A dry method has been studied in recent years in which an electrode mixture is stretched to be formed into a sheet to thereby produce an electrode mixture sheet, and the sheet is laminated onto a core to manufacture an electrode. Patent Literature 1 discloses an electrode film (electrode mixture) produced by mixing an active material, a fibrillable binder such as polytetrafluoroethylene (PTFE), and a conductive agent using a mill, and subjecting the mixture to a treatment for a long time by applying a large shearing force at a high pressure to fibrillate the PTFE. Patent Literature 1 discloses that a content rate of the fibrillated PTFE in the electrode mixture is greater than or equal to 5 wt % and less than or equal to 7 wt %.

CITATION LIST

Patent Literature

PATENT LITERATURE 1: National Publication of International Patent Application No. 2019-512872

SUMMARY

Technical Problem

According to investigation by the present inventors, it has been found that relatively increased content rate of PTFE and subjecting the electrode mixture to the treatment for a long time by applying a large shearing force, as disclosed in Patent Literature 1, cause the conductive agent to adhere not to the active material but to PTFE, and cause PTFE to aggregate, failing to uniformly disperse PTFE upon stretching and formation into a sheet. The poor in-plane dispersibility of the PTFE may decrease tensile strength of the electrode mixture. The art disclosed in Patent Literature 1 has not investigated inhibition of the decrease in the tensile strength of the electrode mixture, and therefore there is still room for improvement.

Accordingly, it is an object of the present disclosure to provide an electrode having improved tensile strength by improving the in-plane dispersibility of PTFE.

Solution to Problem

An electrode according to an aspect of the present disclosure includes: a core; and an electrode mixture stacked on a surface of the core, wherein the electrode mixture includes an active material and PTFE, in an image showing a composition distribution obtained by measuring a surface of the electrode mixture using energy-dispersive X-ray analysis, a standard deviation of an area ratio of the PTFE in adjacent 30 sections each having a size of 150 μm×133 μm is less than or equal to 6%, and when the electrode mixture is divided into three equal parts in a thickness direction and defined as a first region, a second region, and a third region from a side of the core, a content (a) of the PTFE in the first region, a content (b) of the PTFE in the second region, and a content (c) of the PTFE in the third region satisfy $(c-a)/(a+b+c) \leq \pm 10\%$.

A method of manufacturing an electrode according to an aspect of the present disclosure includes: a mixing step of mixing an active material, a conductive agent, and PTFE to produce electrode mixture particles having a solid content concentration of substantially 100%; a stretching step of kneading and simultaneously stretching the electrode mixture particles by passing the electrode mixture particles through a gap between rollers twice or more to produce an electrode mixture sheet; and a laminating step of laminating the electrode mixture sheet onto a core to produce the electrode.

Advantageous Effect of Invention

According to an aspect of the present disclosure, the tensile strength of the electrode may be improved.

DESCRIPTION OF EMBODIMENTS

Hereinafter, embodiments of an electrode and method of manufacturing an electrode according to the present disclosure will be described in detail. Embodiments described below is merely an example, and the present disclosure is not limited to the following embodiments. Drawings referred to in the description of embodiments are schematically illustrated, and a size ratio and the like of constituents illustrated in Drawings should be determined with consideration the following description.

[Electrode]

Although the electrode according to the present disclosure is suitable for a non-aqueous electrolyte secondary battery such as a lithium-ion battery, it may be applied for a battery including an aqueous electrolyte or a power storage device such as a capacitor. Hereinafter, an electrode for a non-aqueous electrolyte secondary battery (particularly, a case of application for a positive electrode) will be exemplified to make a description.

Figure 1:
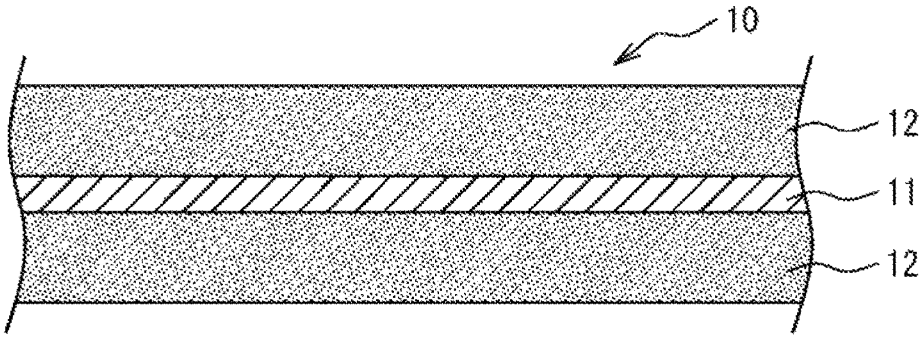
FIG. 1 is a sectional view of an electrode of an example of an embodiment.

FIG. 1 is a sectional view of an electrode of an example of an embodiment. An electrode 10 includes a core 11 and an electrode mixture 12 stacked on a surface of the core. As illustrated in FIG. 1, the electrode 10 may comprise the electrode mixtures 12 on both surfaces of the core 11. The electrode 10 may be an elongated electrode constituting a wound-type electrode assembly, or may be a rectangular electrode constituting a stacked-type electrode assembly. The electrode 10 may be applied for a positive electrode, a negative electrode, or both thereof of the non-aqueous electrolyte secondary battery.

For the core 11, for example, a metal foil and a film having a metal layer formed on a surface thereof, may be used. A thickness of the core 11 is, for example, greater than or equal to 5 μm and less than or equal to 20 μm. In a case of the positive electrode, a metal foil composed of aluminum as a main component may be used for the core 11. In a case of the negative electrode, a metal foil composed of copper as a main component may be used for the core 11. The main component herein means a constituent with the highest mass proportion. The core 11 may be aluminum foil made of substantially 100% aluminum, or may be copper foil made of substantially 100% copper.

The electrode mixture 12 includes an active material and polytetrafluoroethylene (PTFE). A thickness of the electrode mixture 12 is, for example, greater than or equal to 30 μm and less than or equal to 120 μm, and preferably greater than or equal to 50 μm and less than or equal to 100 μm. The electrode mixture 12 may include a conductive agent. Examples of the conductive agent included in the electrode mixture 12 include carbon materials such as carbon black (CB), acetylene black (AB), Ketjenblack, carbon nanotube (CNT), and graphite. A particle diameter of the conductive agent is, for example, greater than or equal to 0.01 μm and less than or equal to 0.1 μm. This particle diameter enables the conductive agent to enter and adhere to a concave part on a surface of a positive electrode active material. A content rate of the conductive agent in the electrode mixture 12 may be, for example, greater than or equal to 0.5 mass % and less than or equal to 5.0 mass %.

For the active material of the positive electrode (positive electrode active material), a lithium-transition metal composite oxide is typically used. Examples of a metal element contained in the lithium-transition metal composite oxide include Ni, Co, Mn, Al, B, Mg, Ti, V, Cr, Fe, Cu, Zn, Ga, Sr, Zr, Nb, In, Sn, Ta, and W. Among them, at least one of Ni, Co, and Mn is preferably contained. For the active material of the negative electrode (negative electrode active material), a carbon-based active material such as: a natural graphite such as flake graphite, massive graphite, and amorphous graphite; and an artificial graphite such as massive artificial graphite (MAG) and graphitized mesophase-carbon microbead (MCMB) is used. For the negative electrode active material, a Si-based active material and the like that forms an alloy with lithium may be used. The active material is a main component in the electrode mixture 12. A content rate of the active material in the electrode mixture 12 is preferably greater than or equal to 85 mass % and less than or equal to 99 mass %, and more preferably greater than or equal to 90 mass % and less than or equal to 99 mass %.

The positive electrode active material is of, for example, secondary particles formed by aggregation of a plurality of primary particles. This may provide roughness on a surface of the positive electrode active material, and enable the conductive agent to enter and adhere to a concave part of this roughness, as noted above. Particle diameters of the primary particles constituting the secondary particles are, for example, greater than or equal to 0.05 μm and less than or equal to 1 μm. The particle diameter of the primary particles is measured as a diameter of a circumscribed circle in a particle image observed with a scanning electron microscope (SEM). The positive electrode active material is of particles having a median diameter (D50) on a volumetric basis of, for example, greater than or equal to 3 μm and less than or equal to 30 μm, preferably greater than or equal to 5 μm and less than or equal to 25 μm, and more preferably greater than or equal to 7 μm and less than or equal to 15 μm. The D50 means a particle diameter at which a cumulative frequency is 50% from a smaller particle diameter side in a particle size distribution on a volumetric basis and is also called a medium diameter. The particle size distribution of the positive electrode active material may be measured by using a laser diffraction-type particle size distribution measuring device (for example, MT3000II, manufactured by MicrotracBEL Corp.) with water as a dispersion medium.

The PTFE is a powder in a dry state, and not a powder in a dispersed state in a dispersion such as water. This may produce the electrode mixture in a dry process, described later. The electrode mixture 12 may include, in addition to the PTFE, a binder such as polyvinylidene fluoride (PVdF), which is not to be fibrillated. The electrode mixture 12 may include a binder to be fibrillated other than PTFE within a range not impairing the object of the present disclosure.

A content rate of PTFE in the electrode mixture 12 is preferably greater than or equal to 0.05 mass % and less than or equal to 5 mass %, and more preferably greater than or equal to 1 mass % and less than or equal to 3 mass %. Since this range inhibits adhesion of the conductive agent to PTFE and allows much conductive agent to be present on the active material surface, this range is preferable from the viewpoint of improvement of the battery characteristics. The PTFE adheres to the particle surface of the active material, and intertwines with the active material. In other words, the active material is held by the PTFE present as a mesh.

The PTFE includes a fibrillated (fiberized) PTFE fiber. The PTFE fiber is a fibrillated PTFE raw material (PTFE particles) belonging to a fibrillable finer powder by a mixing step described later. A median diameter of the PTFE fiber is preferably greater than or equal to 2 μm and less than or equal to 20 μm. The median diameter of the PTFE fiber may be measured with a particle size distribution meter. The median diameter of the PTFE fiber being greater than or equal to 2 μm and less than or equal to 20 μm means that the PTFE fiber has a pulverized size relative to the PTFE particles.

As noted above, many of the PTFE particles are fibrillated to be the PTFE fiber, but the PTFE may include remained PTFE particles not fibrillated. The PTFE particles may be secondary particles. An average particle diameter of the PTFE particles is, for example, greater than or equal to 100 μm and less than or equal to 700 μm, preferably greater than or equal to 100 μm and less than or equal to 500 μm, and more preferably greater than or equal to 100 μm and less than or equal to 400 μm. The average particle diameter of the PTFE particles may be determined by observing the particles of the PTFE raw material with an SEM. Specifically, outer shapes of randomly selected 100 particles are specified, then a major diameter (longest diameter) of each of the 100 particles is determined to specify an average value thereof as the average particle diameter of the PTFE particles.

In an image showing a composition distribution obtained by measuring a surface of the electrode mixture 12 using energy-dispersive X-ray analysis (EDS), a standard deviation of an area ratio of the PTFE in adjacent 30 sections each having a size of 150 μm×133 μm is less than or equal to 6%, preferably less than or equal to 5%, and more preferably less than or equal to 4%. When the standard deviation of the area ratio of the PTFE is less than or equal to 6%, the good in-plane dispersibility of the PTFE may improve the tensile strength. A lower limit of the standard deviation of the area ratio of the PTFE is, for example, 1%.

The area ratio of the PTFE in the adjacent 30 sections each having a size of 150 μm×133 μm preferably has a maximum value of less than or equal to 23% and a minimum value of greater than or equal to 0.1%. This maximum value is more preferably less than or equal to 21%, and particularly preferably less than or equal to 16%. This minimum value is more preferably greater than or equal to 1%, and particularly preferably greater than or equal to 3%.

The adjacent 30 sections each having a size of 150 μm×133 μm may be arrangement such that, for example, 2 sections are arranged in a vertical direction and 15 sections are arranged in a lateral direction, the sections having the size with 150 μm in vertical×133 μm in lateral. For example, an observation field having a size with 300 μm in vertical×399 μm in lateral is analyzed at once by EDS and five observation fields adjacent thereto in the lateral direction similarly analyzed by EDS, and each observation field is divided into two fields in the vertical direction and three fields in the lateral direction to form the 30 sections having the size with 150 μm in vertical×133 μm in lateral. When the five observation fields are analyzed, there may be an overlapped portion of adjacent two observation fields each other.

The area ratio of the PTFE in each section can be calculated as follows, for example.

<Method for Calculating Area Ratio of PTFE>

(1) A mapping image in which a region where a carbon element is present (C region) and a region where a fluorine element is present (F region) are mapped is obtained by EDS. The magnification of EDS is adjusted to form an image having the size with 300 μm in vertical×399 μm in lateral.

(2) The mapping image is input into a computer, and an image analysis software (for example, ImageJ, available from National Institutes of Health) is used to obtain a synthetic image defining an overlapped region of the C region and F region as a region where PTFE is present (PTFE region).

(3) The synthetic image is subjected to a binarizing process by using the image analysis software to obtain a binarizing-processed image in which the PTFE region in the image is converted to green and the other region (blank region) is converted to black.

(4) The binarizing-processed image is divided into two sections in the vertical direction and into three sections in the lateral direction to produce six sections, and an area of the PTFE region and an area of the blank region in each section are calculated.

(5) An area ratio of PTFE in each section may be calculated based on the following formula.

$$\text{Area Ratio of PTFE}=\text{Area of PTFE Region}/(\text{Area of PTFE Region}+\text{Area of Blank Region})\times 100$$

When the electrode mixture 12 is divided into three equal parts in a thickness direction and defined as a first region, a second region, and a third region from a side of the core 11, a content (a) of the PTFE in the first region, a content (b) of the PTFE in the second region, and a content (c) of the PTFE in the third region preferably satisfy (c−a)(a+b+c)≤±10%, and more preferably satisfy (c−a)/(a+b+c)≤±5%. This allows the PTFE to be substantially uniformly present on an entirety of the electrode mixture 12 also in the thickness direction without uneven presence on apart of the electrode mixture 12. Using a dry process, described later, allows the PTFE to be substantially uniformly present on an entirety of the electrode mixture 12.

The electrode 10 may further include an adhesive layer between the core 11 and the electrode mixture 12, the adhesive layer having a function for adhesion of the core 11 and the electrode mixture 12. A thickness of the adhesive layer is, for example, greater than or equal to 1 μm and less than or equal to 10 μm. The adhesive layer may include a conductive agent and a binder, and may have conductivity by the conductive agent. Examples of the conductive agent included in the adhesive layer include carbon materials such as carbon black (CB), acetylene black (AB), Ketjenblack, carbon nanotube (CNT), and graphite. The conductive agent preferably has a smaller particle diameter and a larger specific surface area. This facilitates the adhesive layer to form a structure. The specific surface area of the conductive agent is within a range of, for example, greater than or equal to 100 $m^2/g$ and less than or equal to 150 $m^2/g$. Examples of the binder included in the adhesive layer include fluororesins such as polytetrafluoroethylene (PTFE) and polyvinylidene fluoride (PVdF), polyacrylonitrile (PAN), a polyimide, an acrylic resin, and a polyolefin. The binder included in the adhesive layer is preferably PVdF. The adhesive layer may be produced by, for example: applying a slurry including the conductive agent, the binder, and the like on the surface of the core 11; and drying and then compressing the coating film. The adhesive layer may also be produced on the surface of the core 11 by a dip-coating method or a spray-coating method.

A content rate of the conductive agent in the adhesive layer is preferably greater than or equal to 40 mass % and less than or equal to 80 mass %, more preferably greater than or equal to 45 mass % and less than or equal to 75 mass %, and particularly preferably greater than or equal to 50 mass % and less than or equal to 71 mass %. Relatively increasing the content rate of the conductive agent in the adhesive layer as above may reduce an interface resistance. If the amount of the conductive agent is too large, strength of the adhesive layer itself decreases, and due to this brittle layer structure, conductivity between the electrode mixture 12 and the core 11 is inhibited.

[Method of Manufacturing Electrode]

Hereinafter, the method of manufacturing the electrode 10 will be described in more detail. Although a method of manufacturing the positive electrode will be exemplified hereinafter, this manufacturing method may be similarly applied for manufacturing the negative electrode. In the case of the negative electrode, a negative electrode active material is used instead of the positive electrode active material.

Figure 2A:
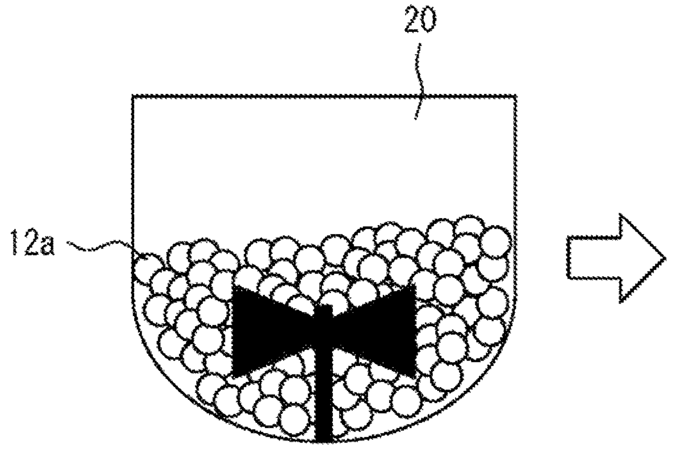
FIG. 2(*a*) is a view illustrating a mixing step, and FIG. 2(*b*) is a view illustrating a stretching step, in a process of manufacturing an electrode of an example of an embodiment.
Figure 2B:
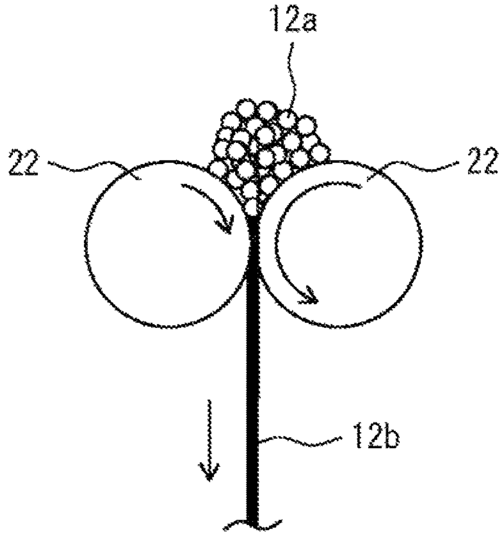
Figure 3:
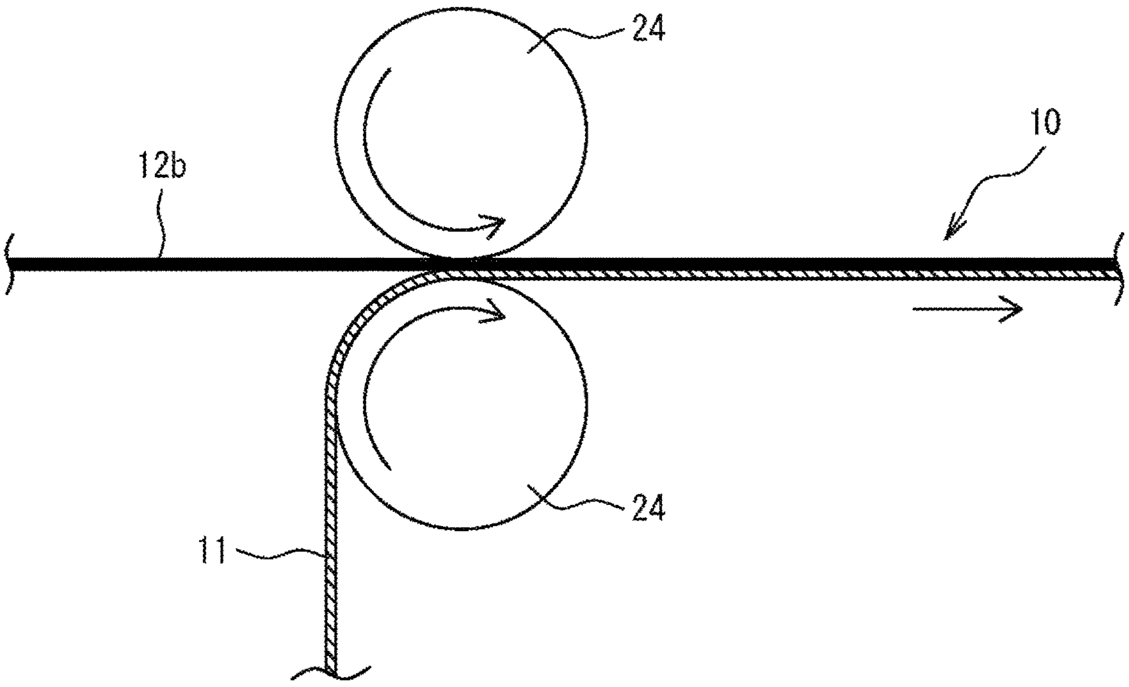
FIG. 3 is a view illustrating a laminating step in a process of manufacturing an electrode of an example of an embodiment.

FIG. 2 (*a*), FIG. 2 (*b*), and FIG. 3 are views schematically illustrating a process of manufacturing the electrode 10 of an example of an embodiment. A method for manufacturing the electrode 10 includes a mixing step illustrated in FIG. 2 (*a*), a stretching step illustrated in FIG. 2 (*b*), and a laminating step illustrated in FIG. 3. In the mixing step, the active material and the PTFE are mixed to produce electrode mixture particles 12*a* having a solid content concentration of substantially 100%. In the stretching step, the electrode mixture particles 12*a* are kneaded and simultaneously stretched to be formed into a sheet, thereby producing an electrode mixture sheet 12*b*. In the laminating step, the electrode mixture sheet 12*b* is laminated onto the core 11 to produce the electrode.

The method of manufacturing the electrode 10 is a dry process of manufacturing the electrode 10 by using the electrode mixture 12 having a solid content concentration of substantially 100%. The dry process is referred to a process of mixing the active material particles and the binder particles without a solvent, that is, the active material and the binder are mixed in a state of a solid content concentration being substantially 100%. The method of manufacturing the electrode 10 according to the present disclosure need not use a solvent like a conventional method of manufacturing the electrode 10. Use of a solvent being unnecessary intends to not only eliminate the solvent as a mere raw material but also eliminate a step of drying the solvent, which may eliminate ventilation equipment and the like involved with the drying step.

In the mixing step, raw materials such as the active material, the PTFE, and a conductive agent are mixed with a mixer 20 to produce the electrode mixture particles 12*a*. As the mixer 20, a conventionally known mechanical stirring mixer may be used, for example. Specific examples of a preferable mixer 20 include a cutter mill, a pin mill, a bead mill, a fine-particle composer (an apparatus generating a shearing force between: a rotor having a special shape and rotating at a high speed in a tank; and a collision plate), a granulator, and a kneader such as a twin-screw extrusion kneader and a planetary mixer. These mixers can apply a mechanical shearing force. A cutter mill, a fine-particle composer, a granulator, and a twin-screw extrusion kneader are preferable. This may mix the raw materials and may further fibrillate the PTFE. A treatment time of the mixing step (time for applying a shearing force to the materials) is preferably within a few minutes, and for example, greater than or equal to 0.5 minutes and less than or equal to 10 minutes. A too long treatment time increases an amount of the conductive agent incorporated into the PTFE. In this case, the battery characteristics are adversely affected such that conductivity of the electrode mixture sheet considerably decreases to rise the resistance.

The mixing step may include: a step of mixing the active material and the conductive agent to produce a coated active material; and a step of mixing the coated active material and the PTFE. Using the coated active material produced by mixing the active material and the conductive agent may shorten a time of mixing the coated active material and the PTFE. This may reduce an amount of the conductive agent incorporated into the PTFE. There is preferably roughness on a surface of the coated active material, and the conductive agent preferably enters and adheres to a concave part of this roughness. This enables the conductive agent on the surface of the coated active material to be hardly removed by the PTFE during the step of mixing the coated active material and the PTFE.

As a method of dry-mixing the active material and the conductive agent, a mechano-fusion method may be used, for example. The mechano-fusion method is a dry-treatment method performed with a mechano-fusion reactor comprising a compressor inside thereof and having a tubular chamber rotating at a high speed. The conductive agent and the active material are fed into the chamber, and the chamber rotates to allow the particles to be pressed with each other and with a wall of the chamber. Using the compressor and generating a centrifugal force with the high-speed rotation enhance the adhering and bonding between the conductive agent and the active material. Examples of the mechano-fusion reactor include: "Nobilta"® crusher or "MECHANO FUSION"® crusher, manufactured by HOSOKAWA MICRON CORPORATION (Japan); "Hybridizer"™ crusher, manufactured by NARA MACHINERY CO., LTD.; "BALANCE GRAN", manufactured by FREUND-TURBO CORPORATION; and "COMPOSI", manufactured by NIPPON COKE & ENGINEERING CO., LTD.

Next, in the stretching step, as illustrated in FIG. 2(*b*), the electrode mixture particles 12*a* are kneaded and simultaneously stretched using a pair of rollers 22 to be formed into a sheet. The pair of rollers 22 are disposed with a predetermined gap, and rotate in the same direction. The electrode mixture particles 12*a* are fed into the gap between the pair of rollers 22 to be compressed with the pair of rollers 22, and to be stretched into a sheet. A linear pressure of the pair of rollers 22 is, for example, greater than or equal to 1 t/cm and less than or equal to 3 t/cm. The pair of rollers 22 have, for example, the same roller diameter. A temperature of the pair of rollers 22 is not particularly limited, and may be, for example, a room temperature, or heated to greater than or equal to a room temperature.

The obtained electrode mixture sheet 12*b* is passed again through the gap between the pair of rollers 22 to loosen and disperse the PTFE. In other words, passing the electrode mixture particles 12*a* through the gap between the pair of rollers 22 twice or more improves the in-plane dispersibility of the PTFE. A number of times of passing the electrode mixture particles 12*a* and the electrode mixture sheet 12*b* formed from the electrode mixture particles 12*a* through the gap between the pair of rollers 22 is preferably greater than or equal to 2 and less than or equal to 50, more preferably greater than or equal to 3 and less than or equal to 40, and particularly preferably greater than or equal to 5 and less than or equal to 20. The stretching step is not limited to the method using only the pair of rollers, and may include a step using another pair of rollers having a different roller diameter, peripheral speed, gap, and the like.

A thickness of the electrode mixture sheet 12*b* obtained after the stretching step may be regulated with, for example, the gap between the pair of rollers 22, the peripheral speed, the number of times of the stretching treatment, and the like. In the stretching step, the electrode mixture particles 12*a* are preferably formed into a sheet using a pair of rollers 22 having peripheral speed ratio differing by a factor of greater than or equal to two. Setting the peripheral speed ratios of the pair of rollers 22 to be different facilitates the thinning of the electrode mixture sheet 12*b* to improve the productivity, for example. A density of the active material in the electrode mixture sheet 12*b* is, for example, greater than or equal to 3.6 g/cm$^3$ and less than or equal to 4.0 g/cm$^3$.

Next, in the laminating step, as illustrated in FIG. 3, the electrode mixture sheet 12*b* is laminated onto the core 11 to obtain the electrode 10 in which the mixture layer composed of the electrode mixture 12 is provided on the surface of the core 11. Although FIG. 3 illustrates a state of the electrode mixture 12 bonded onto only one surface of the core 11, the electrode mixture 12 is preferably bonded onto both surfaces of the core 11. The two electrode mixtures 12 may be simultaneously bonded onto both the surfaces of the core 11. Alternatively, one electrode mixture 12 may be bonded onto one surface of the core 11, and then the other electrode mixture 12 may be bonded onto the other surface. The electrode mixture sheet 12*b* may be laminated onto the core 11 with the adhesive layer interposed therebetween.

In the laminating step, the electrode mixture sheet 12*b* is laminated onto a surface of the core 11 by using a pair of rollers 24. The pair of rollers 24 have the same roller diameter, are disposed with a predetermined gap, and rotate in the same direction at the same peripheral speed, for example. A temperature of the pair of roller 24 is, for example, greater than or equal to 25° C. and less than or equal to 300° C. A linear pressure applied by the pair of rollers 24 is preferably greater than or equal to 0.1 t/cm and less than or equal to 5 t/cm, and more preferably greater than or equal to 0.2 t/cm and less than or equal to 3 t/cm.

EXAMPLES

Hereinafter, the present disclosure will be further described with Examples, but the present disclosure is not limited to these Examples.

Example 1

[Production of Positive Electrode Mixture Particles (Mixing Step)]

A lithium-transition metal composite oxide, acetylene black (AB), and PTFE particles were fed into a mixer (Wonder Crusher, manufactured by OSAKA CHEMICAL Co., Ltd.) in terms of mass ratio of 100:1:2, and the mixture was subjected to a mixing treatment at a room temperature at the number of rotation of Memory 3 for 5 minutes. The number of rotation of Wonder Crusher is maximum 28000 rpm at Memory 10. This mixing treatment yielded positive electrode mixture particles in which the positive electrode active material and the PTFE were uniformly dispersed. The obtained positive electrode mixture had a solid content concentration of 100%.

[Production of Positive Electrode Mixture Sheet (Stretching Step)]

The obtained positive electrode mixture particles were kneaded and simultaneously stretched by being passed through a gap between a pair of rollers five times to produce a positive electrode mixture sheet. A peripheral speed ratio of the pair of rollers was 1:3, and a thickness of the positive electrode mixture sheet was adjusted to be approximately 100 μm.

[Measurement of Tensile Strength]

Using a universal tester (SDMK-1000-D), tensile strength of the positive electrode mixture sheet was evaluated (20 mm/min). The specimen had a width of 12.5 mm and a length of 122 mm.

Example 2

A positive electrode mixture sheet was produced and evaluated in the same manner as in Example 1 except that the number of times of passing the positive electrode mixture particles through the gap between the pair of rollers was changed to 10.

Example 3

A positive electrode mixture sheet was produced and evaluated in the same manner as in Example 1 except that the number of times of passing the positive electrode mixture particles through the gap between the pair of rollers was changed to 20.

Comparative Example

A positive electrode mixture sheet was produced and evaluated in the same manner as in Example 1 except that the number of times of passing the positive electrode mixture particles through the gap between the pair of rollers was changed to 1.

Table 1 shows the results of the measured tensile strength in Examples and Comparative Example. Table 1 also shows: the number of times of passing the positive electrode mixture particles through the gap between the pair of rollers (number of times of roller passing); and the standard deviation, maximum value, and minimum value of the area ratio of PTFE on the electrode mixture surface, calculated by the above method. Table 2 shows the content (a) of PTFE in the first region, content (b) of PTFE in the second region, content (c) of PTFE in the third region, and value of (c−a)/(a+b+c) of Examples and Comparative Example.

TABLE 1

| | Number of times of roller passing | Area ratio of PTFE [%] Standard deviation | Maximum value | Minimum value | Tensile strength [MPa] |
|---|---|---|---|---|---|
| Example 1 | 5 | 3.79 | 15.9 | 3.3 | 0.09 |
| Example 2 | 10 | 4.94 | 20.9 | 3.6 | 0.14 |
| Example 3 | 20 | 3.09 | 15.4 | 3.5 | 0.19 |
| Comparative Example | 1 | 6.51 | 23.7 | 0.8 | Unmeasurable |

TABLE 2

| | a Content of binder in the first region [%] | b Content of binder in the second region [%] | c Content of binder in the third region [%] | (c − a)/(a + b + c) [%] |
|---|---|---|---|---|
| Example 1 | 33 | 35 | 32 | 1 |
| Example 2 | 33 | 34 | 33 | 0 |
| Example 3 | 34 | 33 | 33 | 1 |
| Comparative Example | 32 | 35 | 33 | 1 |

As shown in Table 1, the positive electrode mixture sheets of Examples had higher tensile strength than the positive electrode mixture sheet of Comparative Example. The positive electrode mixture sheet of Comparative Example had so low tensile strength that was unmeasurable. As shown in Table 2, in the positive electrode mixture sheets of Examples, the PTFE is substantially uniformly present in an entirety of the electrode mixture also in the thickness direction.

REFERENCE SIGNS LIST

10 Electrode, 11 Core, 12 Electrode mixture, 12*a* Electrode mixture particle, 12*b* Electrode mixture sheet, 20 Mixer, 22, 24 Roller

The invention claimed is:

1. An electrode, including:

a core; and an electrode mixture stacked on a surface of the core, wherein the electrode mixture includes an active material and PTFE, in an image showing a composition distribution obtained by measuring a surface of the electrode mixture using energy-dispersive X-ray analysis, a standard deviation of an area ratio of the PTFE in adjacent 30 sections each having a size of 150 μm×133 μm is less than or equal to 6%, and when the electrode mixture is divided into three equal parts in a thickness direction and defined as a first region, a second region, and a third region from a side of the core, a content (a) of the PTFE in the first region, a content (b) of the PTFE in the second region, and a content (c) of the PTFE in the third region satisfy $(c-a)/(a+b+c) \leq \pm 10\%$.

2. The electrode according to claim 1, wherein the area ratio of the PTFE in the adjacent 30 sections each having a size of 150 μm×133 μm has a maximum value of less than or equal to 23% and a minimum value of greater than or equal to 0.1%.

3. The electrode according to claim 1, wherein a content rate of the PTFE in the electrode mixture is greater than or equal to 0.05 mass % and less than or equal to 5 mass %.

4. The electrode according to claim 1, further including an adhesive layer between the core and the electrode mixture, the adhesive layer having a function for adhesion of the core and the electrode mixture.

5. A method of manufacturing an electrode, including:

a mixing step of mixing an active material, a conductive agent, and PTFE to produce electrode mixture particles having a solid content concentration of substantially 100%;

a stretching step of kneading and simultaneously stretching the electrode mixture particles by passing the electrode mixture particles through a gap between a pair of rollers twice or more to produce an electrode mixture sheet; and a laminating step of laminating the electrode mixture sheet onto a core to produce the electrode, wherein the mixing step includes mixing the active material and the conductive agent to produce a coated active material; and mixing the coated active material and the PTFE.

* * * * *